(12) United States Patent
Sasaki et al.

(10) Patent No.: US 7,843,160 B2
(45) Date of Patent: Nov. 30, 2010

(54) MOTOR DRIVING CONTROL METHOD AND MOTOR DRIVING CONTROL APPARATUS

(75) Inventors: Toshie Sasaki, Osaka (JP); Yutaka Mori, Osaka (JP); Toshio Kohno, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 551 days.

(21) Appl. No.: 11/915,959

(22) PCT Filed: Jun. 2, 2006

(86) PCT No.: PCT/JP2006/311103

§ 371 (c)(1),
(2), (4) Date: Nov. 29, 2007

(87) PCT Pub. No.: WO2006/129799

PCT Pub. Date: Dec. 7, 2006

(65) Prior Publication Data

US 2010/0001680 A1     Jan. 7, 2010

(30) Foreign Application Priority Data

Jun. 3, 2005    (JP)  ............... 2005-164657

(51) Int. Cl.
*B62D 5/04*     (2006.01)
*B62D 6/00*     (2006.01)

(52) U.S. Cl. .......... 318/675; 318/400.15; 318/461; 318/489

(58) Field of Classification Search ............ 318/400.02, 318/400.07, 400.15, 400.26, 400.34, 432, 318/433, 461, 489, 675

See application file for complete search history.

(56) References Cited

U.S. PATENT DOCUMENTS

| 6,427,105 | B1 * | 7/2002 | Matsushita | .................. 701/41 |
| 6,864,662 | B2 * | 3/2005 | Recker | ..................... 318/807 |
| 2006/0113938 | A1 * | 6/2006 | Arai | .......................... 318/432 |

FOREIGN PATENT DOCUMENTS

| JP | 2003 324985 | 11/2003 |
| JP | 2004 58768 | 2/2004 |
| JP | 2004 117070 | 4/2004 |

OTHER PUBLICATIONS

Sugimoto, et al., "Theory and Practice of AC Servomotor System", Sougou-Denshi, pp. 73-77, 1990.

* cited by examiner

*Primary Examiner*—Bentsu Ro
(74) *Attorney, Agent, or Firm*—Oblon, Spivak, McClelland, Maier & Neustadt, L.L.P.

(57) ABSTRACT

A motor driving control method in which when the steering angular velocity is lower than a predetermined reference angular velocity, an actual motor drive current is inferred from a back electromotive voltage and an applying voltage in a three-phase brushless motor, and a limitation on the peak level of each of three-phase alternating current command waves is mitigated by permitting the interval between a pair of intersection points of a peak area of each of the three-phase alternating current command waves with a peak point neighborhood of a triangle wave to become approximately the same length as a dead time.

6 Claims, 16 Drawing Sheets

MOTOR DRIVING CONTROL METHOD AND MOTOR DRIVING CONTROL APPARATUS

TECHNOLOGICAL FIELD

The present invention relates to a motor driving control method and a motor driving control apparatus for drivingly controlling a three-phase brushless motor which is provided in a vehicle for steering assist, in dependence on a steering angle, a vehicle speed and other driving states.

BACKGROUND ART

In a motor driving control apparatus shown in FIG. 13 which has been known heretofore, a microcomputer 1 determines a command value Iq1* of motor drive current in dependence on a driving state, and in dependence on the command value Iq1*, an inverter control circuit 2 performs ON/OFF controls of respective switches UH, UL, VH, VL, WH, WL of a three-phase bridge circuit 3, whereby three-phase alternating currents as motor drive current are applied from the three-phase bridge circuit 3 to a three-phase brushless motor 4 for steering assist. Further, shunt resistances R1, R2, R3 are connected in series to the switches UL, VL, WL at a lower stage of the three-phase bridge circuit 3, and current-feedback control is performed by detecting an actual motor drive current based on inter-terminal voltages of these shunt resistances R1, R2, R3.

Patent Document 1: Japanese unexamined, published patent application No. 2004-117070 (FIG. 1)

DISCLOSURE OF THE INVENTION

Problem to be Solved by the Invention

By the way, the aforementioned inverter control circuit 2 determines the timings to turn ON/OFF the respective switches UH, UL, . . . in the triangle comparison method. That is, based on the command value Iq1* of the motor drive current, three-phase alternating current command waves Vu*, Vv*, Vw * shown in FIG. 14 are generated and compared with a triangle wave K (generally called "transfer wave" or "carry wave"), and ON/OFF timings for the switches UH, UL, . . . are determined from the intersection points of the three-phase alternating current command waves Vu*, Vv*, Vw* with the triangle wave K, as shown in FIG. 15. The cycle of the triangle wave K is set to be extremely short compared with the cycle of the three-phase alternating current command waves Vu*, Vv*, Vw*, and in FIGS. 14 and 15, the cycle of the triangle wave K is drawn as being sufficiently longer than the actual cycle in order to schematically show the three-phase alternating current command waves Vu*, Vv*, Vw* and the triangle wave K. Further, in FIG. 15, the three-phase alternating current command waves Vu*, Vv*, Vw* are partially enlarged and are represented by lines for simplicity.

Generally, in a motor driving control apparatus like this, the current detection for current-feedback control is performed at the timing that the triangle wave K reaches its peak point. This is for the reason that the timing at which the triangle wave K reaches the peak point is the hardest to suffer the influence of switching noise. Further, the switches UH, UL, . . . take a time to switch completely from an ON state to an OFF state. Thus, to avoid the occurrence of through current, a predetermined dead time T1 has to be provided between the timing at which of the switches at both of the upper and lower stages, those in the ON state start to become OFF and the timing at which those in the OFF state start to become ON. For these reasons, as shown in FIG. 16, the peak level of each of the three-phase alternating current command waves Vu*, Vv*, Vw* (Vu* only is exemplified in FIG. 16) has heretofore been limited so that the distance between a pair of intersection points P1, P1 of a peak area of each three-phase alternating current command wave Vu*, Vv*, Vw* with a peak point neighborhood of the triangle wave K becomes equal to or longer than the sum (T3 in the same figure) of a current detection time T2 by the shunt resistances R1, R2, R3 and a dead time T1. In other words, the maximum value of the duty ration (r) in the PWM control has heretofore been limited to a value calculated by the following expression. That is, in the prior art, the output of a direct current power supply 5 (refer to FIG. 13) connected to the three-phase bridge circuit 3 has not been utilized effectively.

$$r<1-([\text{dead time } T1]+[\text{current detection time } T2])/[\text{one mountain cycle } T4 \text{ of triangle wave}]$$

The present invention has been made taking the foregoing circumstances into consideration, and an object thereof is to provide a motor driving control method and a motor driving control apparatus capable of effectively utilizing a direct current power supply connected to a three-phase bridge circuit.

Measures for Solving the Problem

A motor driving control method according to the invention of claim 1 made to accomplish the foregoing object is a motor driving control method for applying three-phase alternating currents as motor drive current from a three-phase bridge circuit to a three-phase brushless motor provided in a vehicle for steering assist, by performing PWM control in a triangle comparison method based on a command value determined in dependence on a steering angle, a vehicle speed and other driving states and for performing current-feedback control with actual motor drive currents detected by shunt resistances, the motor driving control method being characterized in that when a steering angular velocity is lower than a predetermined reference angular velocity, actual motor drive currents are detected by the respective shunt resistances with the peak level of each of three-phase alternating current command waves being limited so that the interval between a pair of intersection points of a peak area of each of the three-phase alternating current command waves with a peak point neighborhood of the triangle wave which waves are compared in the triangle comparison method is made to be longer than the sum of a current detection time by the shut resistances and a dead time for switching and that when the steering angular velocity is higher than the reference angular velocity, an actual motor drive current is inferred from a back electromotive voltage and an applying voltage in the three-phase brushless motor instead of the current detections by the shunt resistances, and the limitation on the peak level of each of the three-phase alternating current command waves is mitigated by permitting the interval between the pair of intersection points becomes approximately the same length as the dead time.

A motor driving control apparatus according to the invention of claim 2 is a motor driving control apparatus which comprises a three-phase bridge circuit connected to a three-phase brushless motor provided in a vehicle for steering assist, a motor control circuit for making the three-phase bridge circuit output three-phase alternating currents as motor drive current, by performing PWM control in a triangle comparison method based on a command value determined in dependence on a steering angle, a vehicle speed and other driving states, and shunt resistances for providing current-feedback of the motor drive current, the motor driving control apparatus being characterized in that steering state judgment means is further provided for judging whether the steering manipulation is at the time of an ordinary steering in which the steering angular velocity is lower than a predetermined reference steering angular velocity or at the time of a quick steering in which the steering angular velocity is higher than the reference steering angular velocity, that at the time of the ordinary steering, the motor control circuit detects actual motor drive currents by the respective shunt resistances with the peak level of each of the three-phase alternating current command waves being limited so that the interval between a pair of intersection points of a peak area of each of the three-phase alternating current command waves with a peak point neighborhood of a triangle wave which waves are compared in the triangle comparison method becomes longer than the sum of a current detection time by the shunt resistances and a dead time for switching and that at the time of the quick steering, the motor control circuit infers an actual motor drive current from a back electromotive voltage and an applying voltage in the three-phase brushless motor instead of the current detections by the shunt resistances and mitigates the limitation on the peak level of each of the three-phase alternating current command waves by permitting the interval between the pair of intersection points becomes approximately the same length as the dead time.

The invention according to claim 3 is characterized in that in the motor driving control apparatus as set forth in claim 2, output voltage judgment means is further provided for judging whether or not, the output voltage from a direct current power supply provided in the vehicle to the three-phase bridge circuit is higher than a predetermined reference output voltage and that the motor control circuit mitigates the limitation on the peak level of each of the three-phase alternating current waves under the condition that the output voltage of the direct current power supply is higher than the reference output voltage.

The invention according to claim 4 is characterized in that in the motor driving control apparatus as set forth in claim 2 or 3, engine rotational speed judgment means is further provided for judging whether or not, the rotational speed of an engine provided in the vehicle is higher than a predetermined reference rotational speed and that the motor control circuit mitigates the limitation on the peak level of each of the three-phase alternating current waves under the condition that the rotational speed of the engine is higher than the reference rotational speed.

Effects Of The Invention

With the construction of the present invention, when the steering angular velocity is smaller than the reference angular velocity, the current detections by the shunt resistances becomes possible by limiting the peak level of each of the three-phase alternating current command waves so that the interval between the pair of intersection points of the peak area of each of the three-phase alternating current command waves with the peak point neighborhood of the triangle wave which waves are compared in the triangle comparison method is made to be longer than the sum of the current detection time by the shut resistances and the dead time for switching. Then, when the steering angular velocity is higher than the reference angular velocity, by inferring the actual motor drive current from the back electromotive voltage and the like instead of the current detections by the shunt resistances, the peak level of each of the three-phase alternating current command waves can be raised to the level that the interval between the pair of intersection points of the peak area of each of the three-phase alternating current command waves with the peak point neighborhood of the triangle wave becomes approximately the same length as the dead time. That is, it can be realized to heighten the duty ratio in the PWM control. Therefore, the output power of the direct current power supply connected to the three-phase bridge circuit can be utilized effectively, and hence, it can be realized to increase the power supply quantity to the three-phase brushless motor.

In the invention of claim 3, since the power supply quantity to the three-phase brushless motor is increased by mitigating the limitation on the peak level of each of the three-phase alternating current waves under the condition that the output voltage of the direct current power supply to the three-phase bridge circuit is higher than the reference output voltage, it can be realized to prevent the output voltage of the direct current power supply from falling in deficiency.

In the invention of claim 4, since the power supply quantity to the three-phase brushless motor is increased by mitigating the limitation on the peak level of each of the three-phase alternating current waves under the condition that the rotational speed of the engine is higher than the reference rotational speed, the direct current power supply is supplied with electricity from the engine while the power supply quantity to the three-phase brushless motor is increased, and therefore, it can be realized to prevent the output power of the direct current power supply from decreasing.

Figure 1:
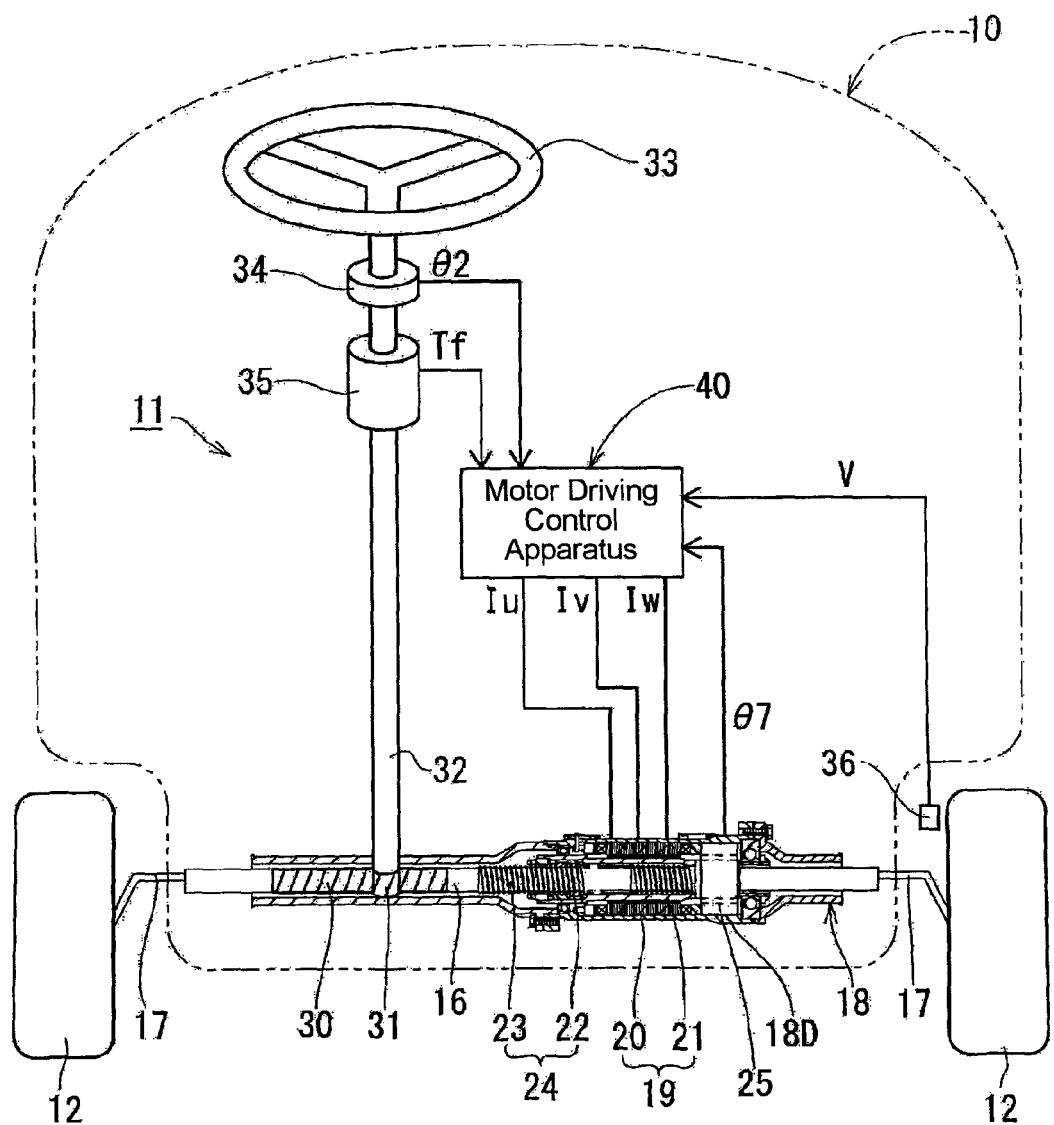
[FIG. 1] is a schematic view of a vehicle relating to a first embodiment according to the present invention.

DESCRIPTION OF REFERENCE SYMBOLS 10 vehicle
14 direct current power supply
19 three-phase brushless motor
40 motor driving control apparatus
43 three-phase bridge circuit
43U, 43V, 43W respective phase circuits
44 motor control circuit
K triangle wave
PG1, PG2 condition judgment programs
Ru, Rv, Rw shunt resistances
T1 dead time
T2 current detection time
UH, UL, VH, VL, WH, WL switches

PREFERRED EMBODIMENTS FOR PRACTICING THE INVENTION

First Embodiment

Hereafter, a first embodiment of the present invention will be described with reference to FIGS. 1-9. A vehicle 10 shown in FIG. 1 is provided with an electric power steering system 11 and is capable of steering steered wheels 12, 12 by assisting the steering manipulation by the driver by a three-phase brushless motor 19 (hereafter referred to simply as "motor 19"). Specifically, an inter-steered wheel shaft 16 is arranged between a pair of the steered wheels 12, 12, and the inter-steered wheel shaft 16 passes through a sleeve housing 18. Opposite ends of the inter-steered wheel shaft 16 are connected to the respective steered wheels 12, 12 through tie rods 17, 17, and the sleeve housing 18 is secured to a body of the vehicle 10. Further, the sleeve housing 18 is provided at an axially middle portion thereof with a large-diameter portion 18D, in which the motor 19 is built. The motor 19 is composed of a stator 20 which is inserted and secured to the internal surface of the sleeve housing 18, and a sleeve-like rotor 21 loosely inserted inside the stator 20. Then, the inter-steered wheel shaft 16 passes through the rotor 21. Further, the large-diameter portion 18D of the sleeve housing 18 is provided at its one end with a motor rotational angle sensor 25 (e.g., resolver) for detecting the rotational position of the rotor 21.

A ball screw nut 22 is assembled in the internal surface of the rotor 21. Further, a ball screw portion 23 is formed on a middle portion in the axial direction of the inter-steered wheel shaft 16. The ball screw nut 22 and the ball screw portion 23 constitute a ball screw mechanism 24, so that when the ball screw nut 22 is rotated together with the rotor 21, the ball screw portion 23 is moved linearly with respect to the sleeve housing 18 to steer the steered wheels 12, 12.

On one end side of the inter-steered wheel shaft 16, a rack 30 is formed and is in meshing with a pinion 31 provided at a lower end of a steering shaft 32. A steering wheel 33 is attached to an upper end of the steering shaft 32.

The steering shaft 32 has attached thereto a steering angle sensor 34 and a torque sensor 35, which respectively detect the steering angle θ2 of the steering wheel and the load torque Tf exerted on the steering shaft 32. Further, a vehicle speed sensor 36 for detecting the vehicle speed V based on rotation of the steered wheel 12 is provided close to that steered wheel 12.

Figure 2:
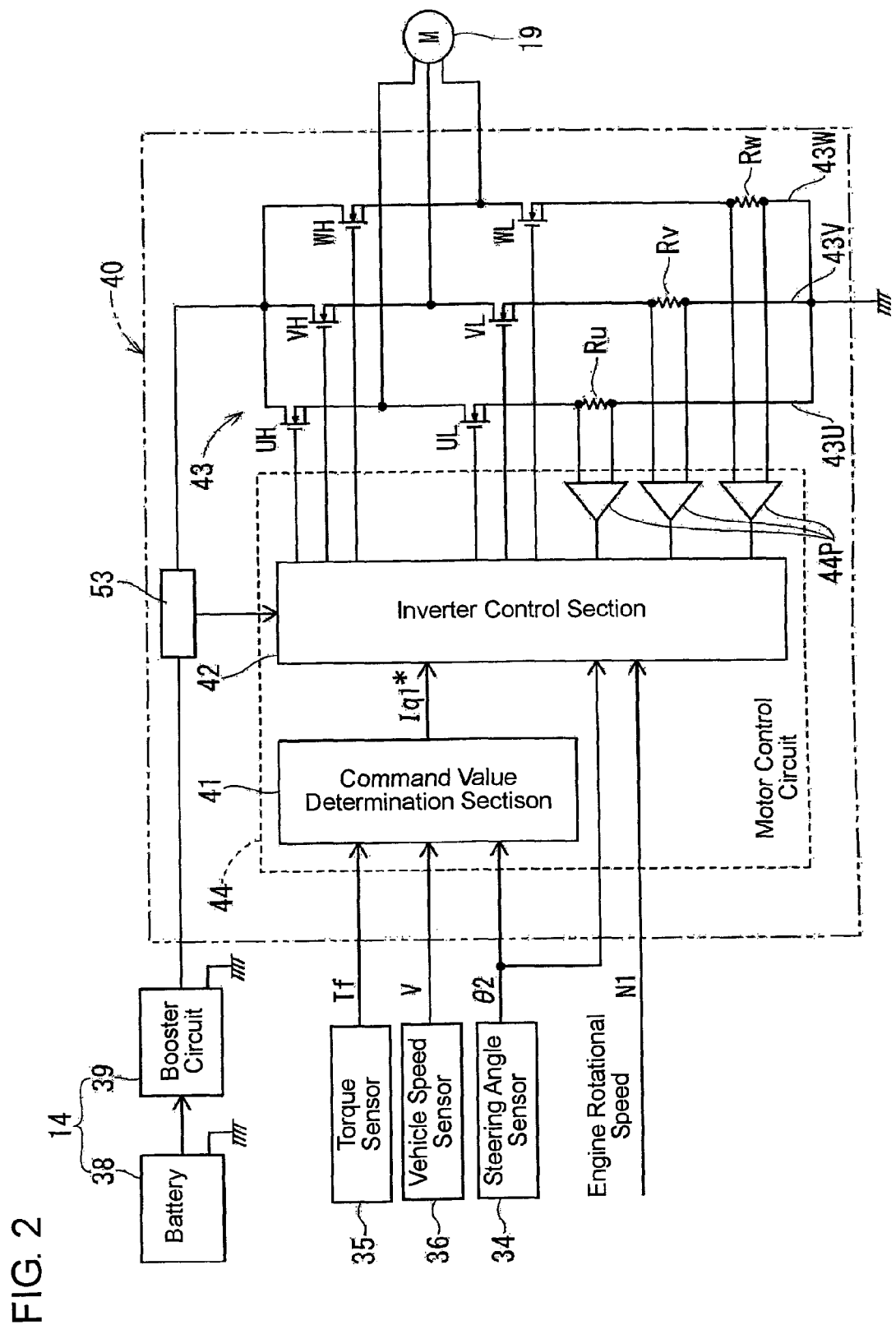
[FIG. 2] is a circuit diagram of a motor driving control apparatus.

The motor 19 is drivingly controllable by a motor driving control apparatus 40. As shown in FIG. 2, the motor driving control apparatus 40 has a three-phase bridge circuit 43 and a motor control circuit 44. The motor control circuit 44 is composed of a command value determination section 41 and an inverter control section 42.

The three-phase bridge circuit 43 is provided with three phase circuits 43U, 43V, 43W corresponding to coils for a U-phase, a V-phase and a W-phase of the motor 19. Further, a direct current power supply 14 is constituted by connecting a booster circuit 39 to a battery 38 and boosts the output voltage of the battery 38 by the booster circuit 39 to apply the boosted voltage to the three-phase bridge circuit 43. Further, the battery 38 receives electricity from an alternator (not shown) which is operated together with an engine.

On the phase circuit 43U of the three-phase bridge circuit 43, an upper stage switch UH, a lower stage switch UL and a shunt resistance Ru are connected in series in turn from the side of a connection point with a positive electrode of the direct current power supply 14. A U-phase coil in the motor 19 is connected to a common connection portion between both of the switches UH, UL. In the same way, on the phase circuit 43V, an upper stage switch VH, a lower stage switch VL and a shunt resistance Rv are connected in series, and a V-phase coil in the motor 19 is connected. On the phase circuit 43W, an upper stage switch WH, a lower stage switch WL and a shunt resistance Rw are connected in series, and a W-phase coil in the motor 19 is connected.

The switches UH, UL, WH, . . . in the three-phase bridge circuit 43 are all constituted by N-channel MOSFETs, gate terminals of which are connected to the inverter control section 42 of the motor control circuit 44. Further, terminal-to-terminal voltages of the shunt resistances Ru, Rv, Rw are inputted to the inverter control section 42 through amplifiers 44P, 44P, 44P provided in the motor control circuit 44. Further, the inverter control section 42 has also inputted thereto electric potentials at median points of the phase circuits 43U, 43V, 43W of the three-phase bridge circuit 43 (i.e., at the connection points of the phase circuits 43U, 43V, 43W with the respective phase coils of the motor 19).

Figure 3:
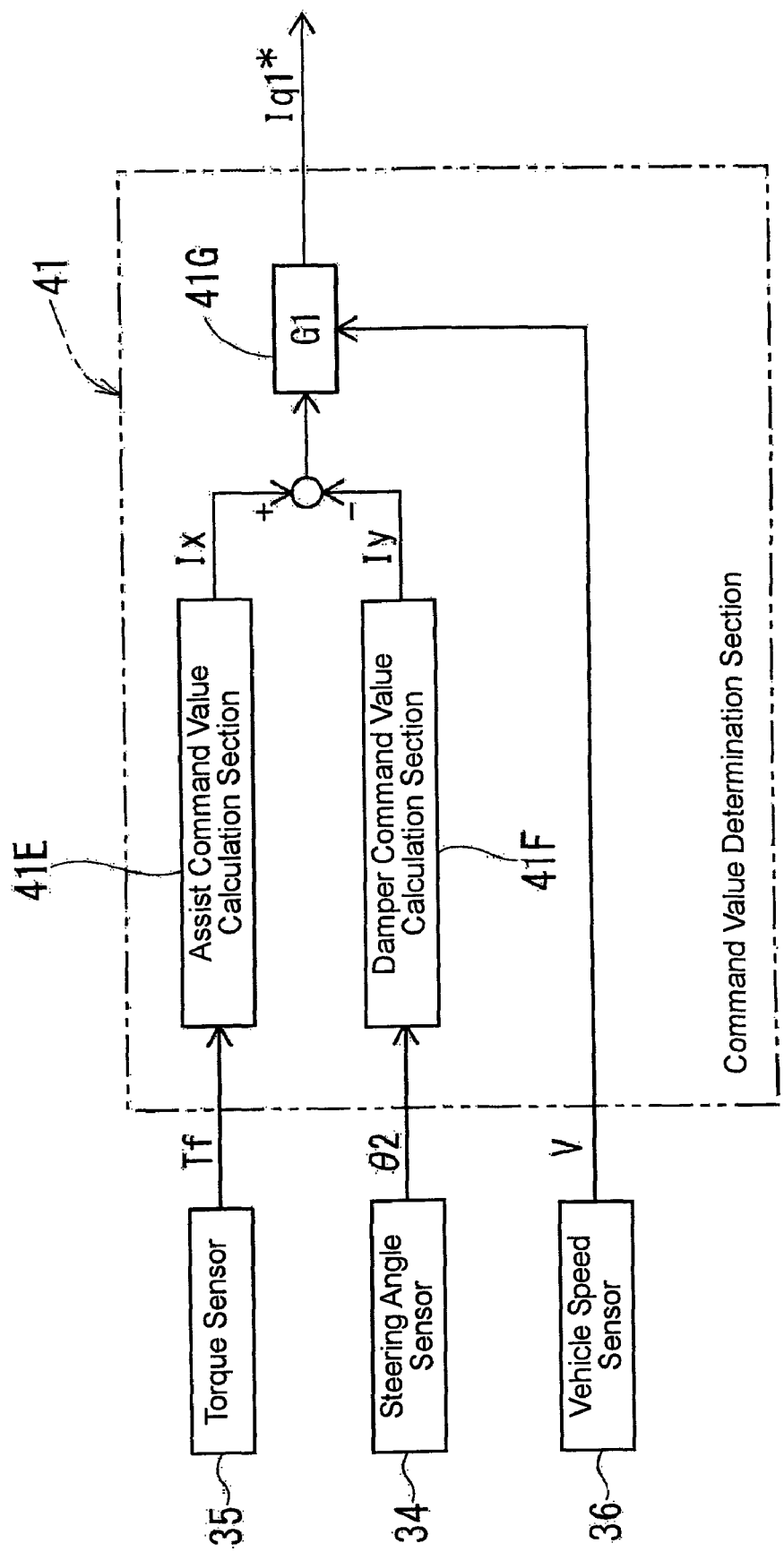
[FIG. 3] is a block diagram of a command value determination section.
Figure 4:
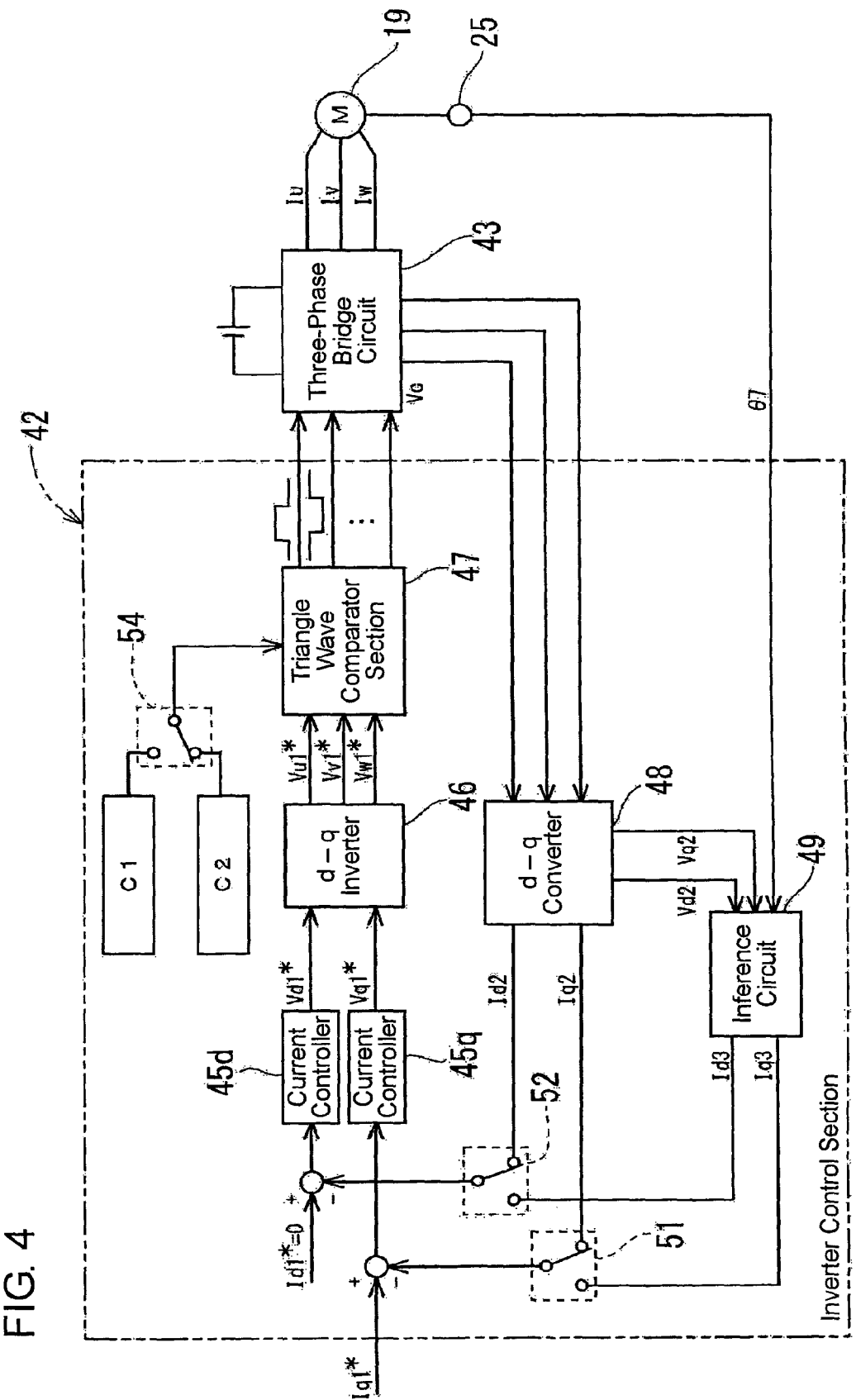
[FIG. 4] is a block diagram of an inverter control section.
Figure 5:
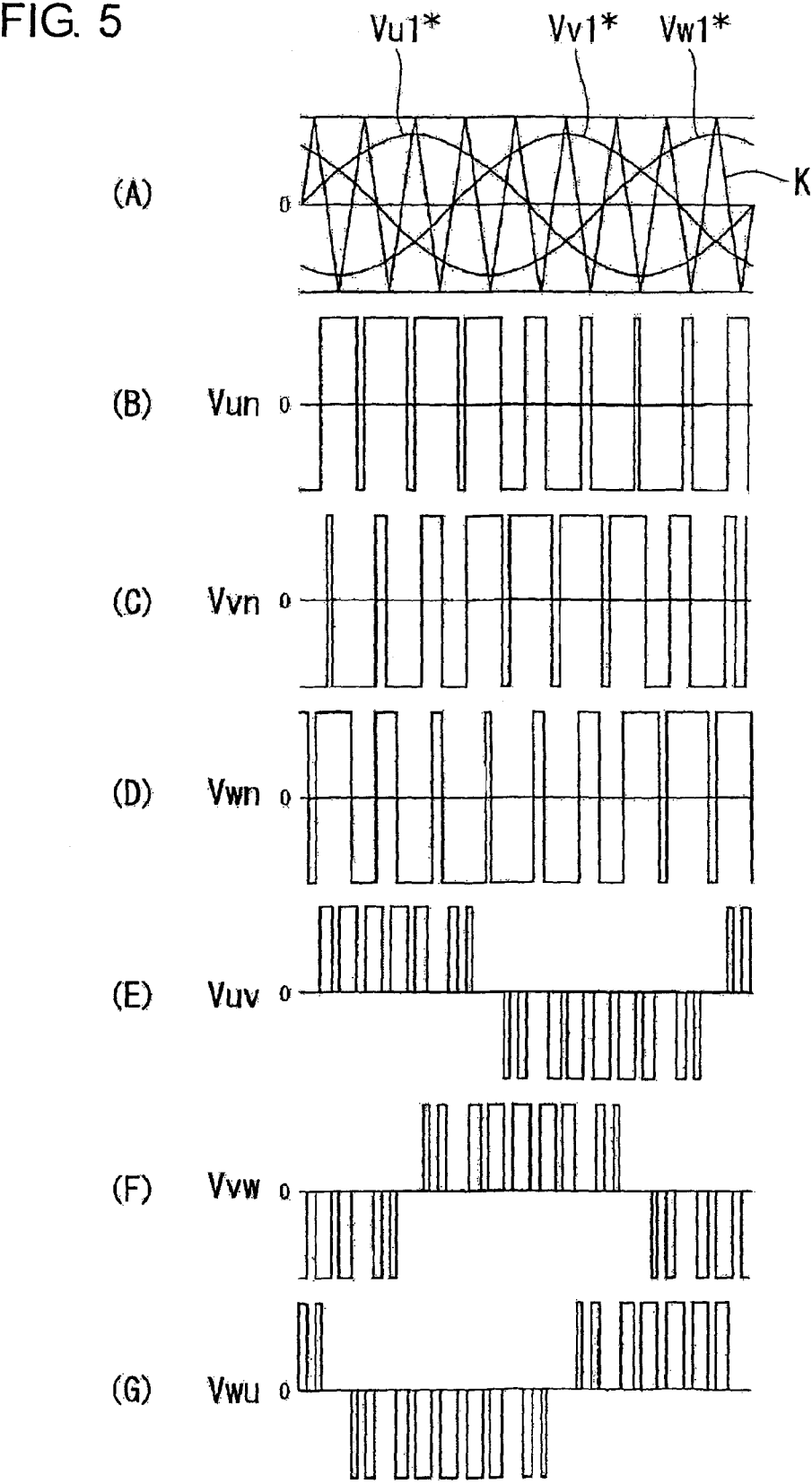
[FIG. 5] is a graph showing waves generated through PWM control.

The command value determination section 41 is represented in the form of a control block diagram in FIG. 3. As shown in the figure, the command value determination section 41 receives respective detection results (load torque Tf, steering angle θ2 of steering wheel and vehicle speed V) from the torque sensor 35, the steering angle sensor 34 and the vehicle speed sensor 36 and determines a command value Iq1* of the motor drive current. Specifically, an assist command value calculation section 41E determines an assist current command value Ix depending on the load torque Tf, based on the load torque Tf and a torque-current command value map (not shown). Further, a damper command value calculation section 41F calculates a steering angular velocity by differentiating the steering angle θ2 with respect to time and determines a damper current command value Iy depending on the steering angular velocity, based on the steering angular velocity and a steering angular velocity-current command value map (not shown). Additionally, a gain determination section 41G determines a gain G1 from the vehicle speed V and a vehicle speed-gain map (not shown). Then, the command value Iq1* (=G1·(Ix−Iy)) of the motor drive current is determined by multiplying the gain G1 with a value which is made by subtracting the damper current command value Iy from the assist current command value Ix. Here, the command value determination section 41 calculates the command value Iq1* as a q-axis current in a d-q conversion.

The aforementioned torque-current command value map is set to make the assist current command value Ix increase as the load torque Tf increases, for example. Thus, an increment of the load torque Tf can be cancelled by an assist torque which the motor 19 generates in dependence on the assist current command value Ix, and hence, the driver is enabled to perform a steering manipulation while feeling a stable steering reaction force regardless of the friction coefficient of the road surface.

Further, the aforementioned steering angular velocity-current command value map is set to make the damper current command value Iy increase as the steering angular velocity increases. Since the damper current command value Iy is subtracted from the assist current command value Ix, there can be achieved a damper effect that the steering resistance becomes larger upon a quick steering manipulation.

Further, the vehicle speed-gain map is set to make the gain G1 smaller as the vehicle speed V increases. Thus, the assist torque by the motor 19 is decreased as the vehicle speed V increases, so that the quick steering manipulation is suppressed during a high speed traveling, whereas the vehicle 10 is enabled to make a large turn with a light steering manipulation during a slow speed traveling.

The inverter control section 42 receives a command value Iq1* of the motor drive current from the command value determination section 41 and performs ON/OFF drives of the switches UH, UL, VH, . . . of the three-phase bridge circuit 43. For this purpose, the inverter control section 42 is configured as shown in the form of a control block diagram in FIG. 4. Further, the inverter control section 42 takes the command value Iq1* inputted from the command value determination section 41 as a command value for the q-axis current and processes a command value Id1* for the d-axis current as "0". Specifically, in the inverter control section 42, a q-axis current controller 45q calculates a q-axis applying voltage Vq1* from the difference between the q-axis current command value Iq1* and an actual q-axis current Iq2 referred to later. Likewise, a d-axis current controller 45d calculates a d-axis applying voltage Vd1* from the difference between the d-axis current command value Id1* (=0) and an actual d-axis current Id2. Then, a d-q inverter 46 performs a d-q inversion of the applying voltages Vq1*, Vd1* to the q-axis and the d-axis and generates three-phase alternating current waves Vu1*, Vv1*, Vw1* shown in FIG. 5(A).

Figure 6:
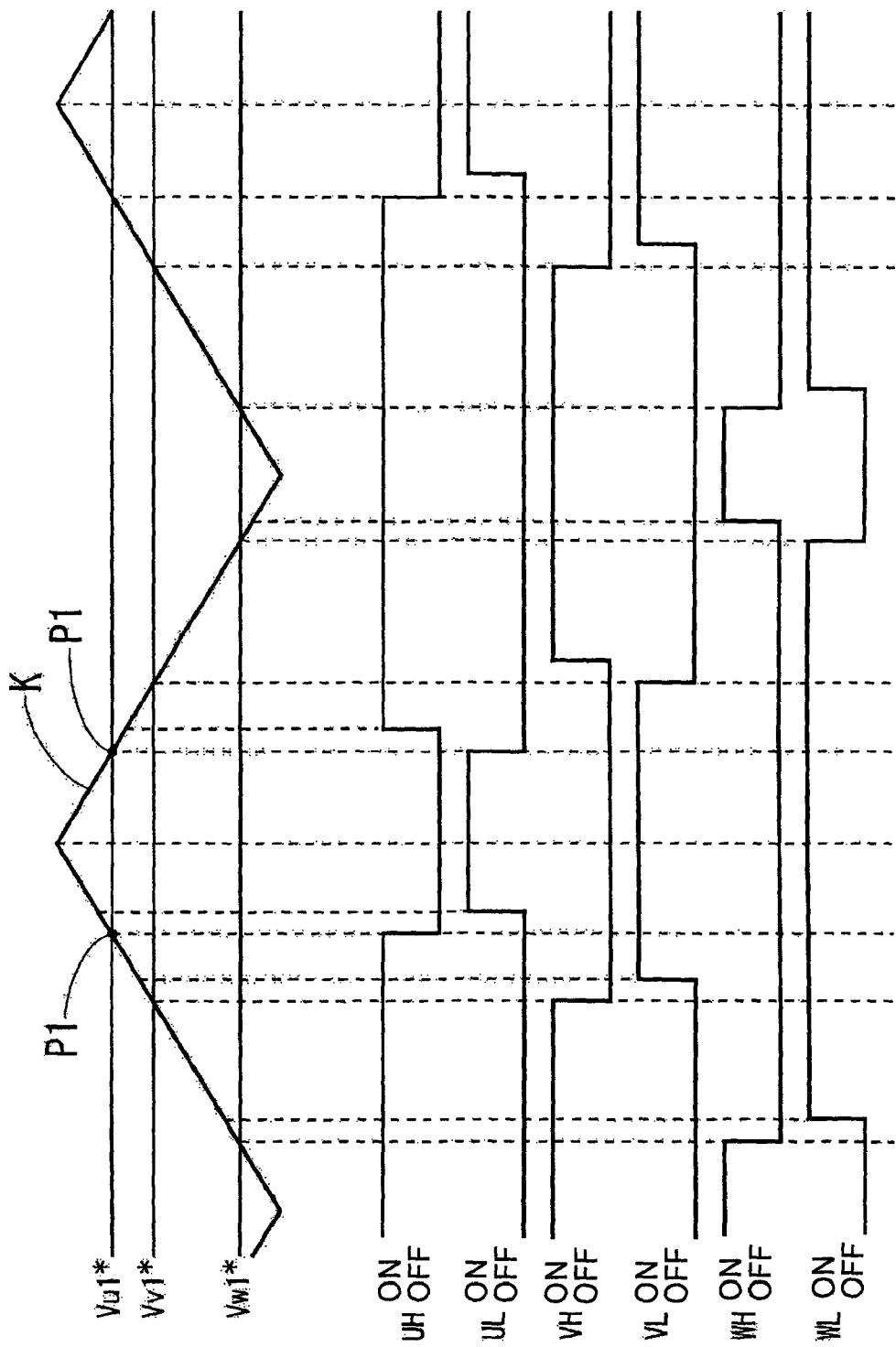
[FIG. 6] is a graph showing a triangle wave, three-phase alternating current command waves, and ON/OFF control waves.
Figure 7:
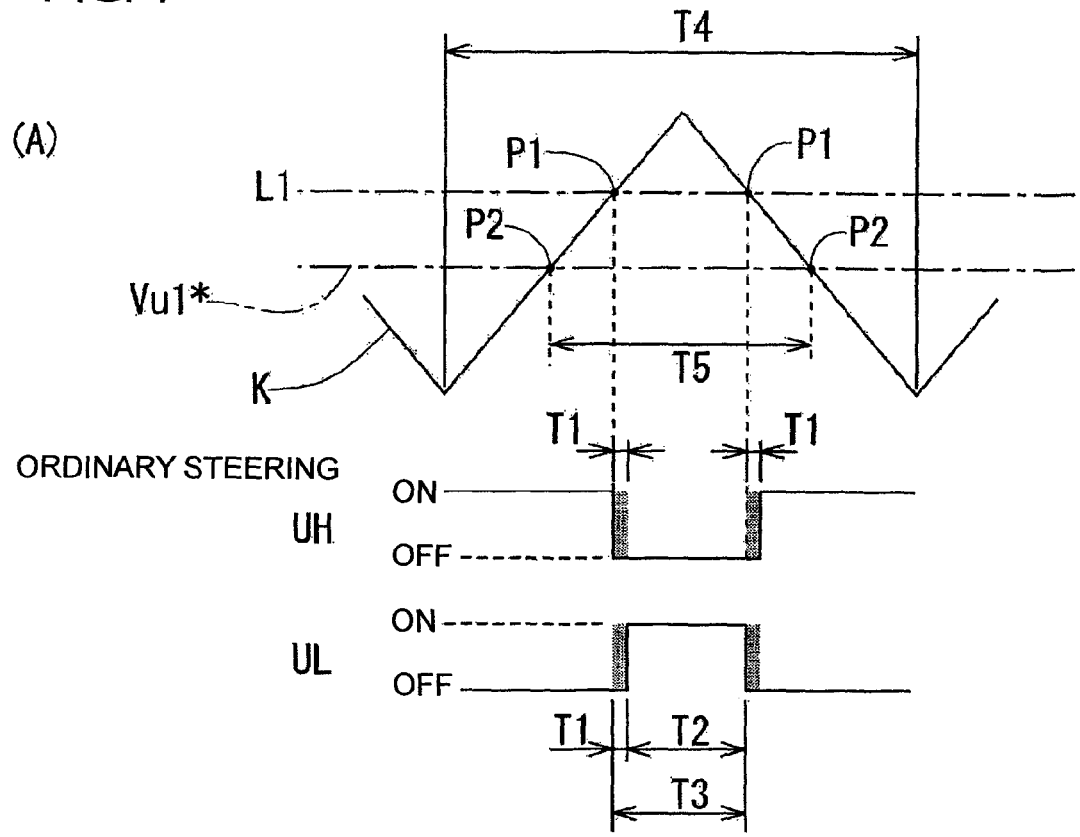
[FIG. 7] is a graph showing the triangle wave, a three-phase alternating current command wave, and ON/OFF control waves.
Figure 7:
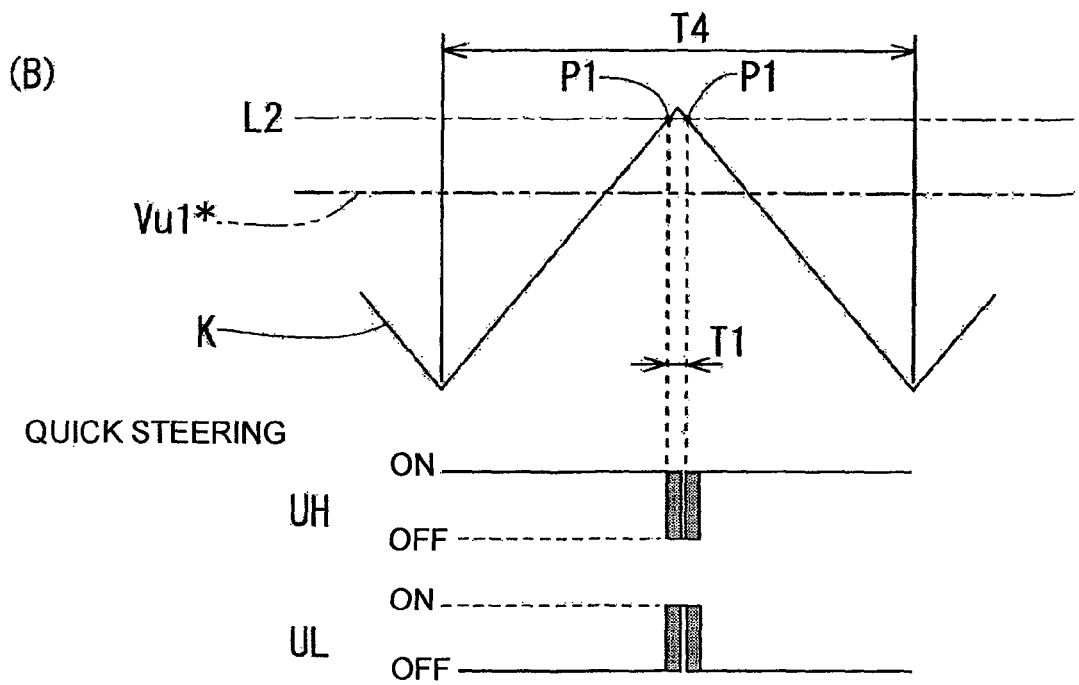
Figure 8:
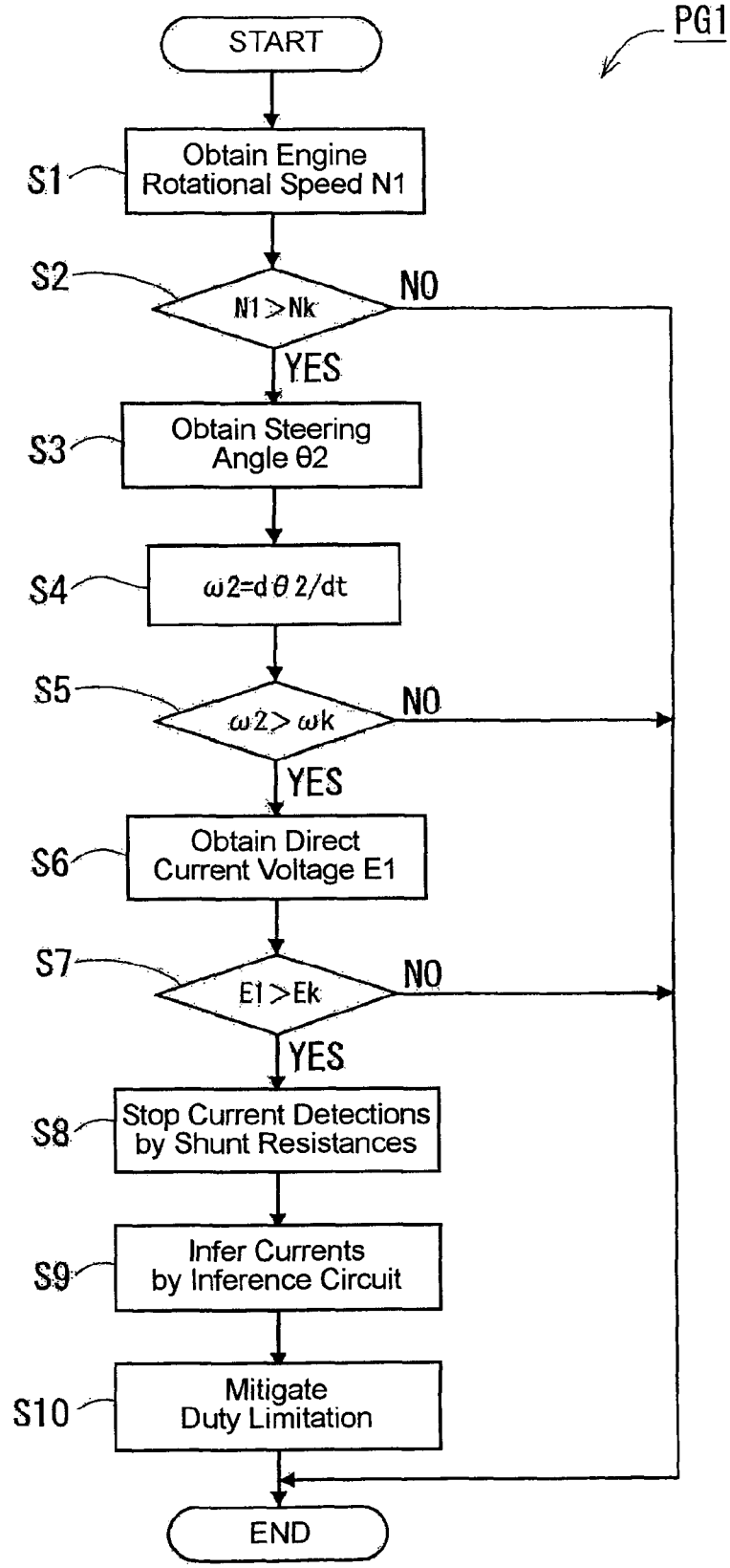
[FIG. 8] is a flow chart of a condition judgment program.

A triangle wave comparator section 47 generates a triangle wave K shown in FIG. 5(A). As shown in FIG. 6, the triangle wave comparator section 47 determines ON/OFF timings for the switches UH, UL, VH, . . . from intersection points of the three-phase alternating current waves Vu1*, Vv1*, Vw1* with the triangle wave K and performs ON/OFF drives of the switches UH, UL, VH, . . . . Thus, a pulse wave Vun shown in FIG. 5(B) is applied between both terminals of the U-phase coil in the motor 19, a pulse wave Vvn shown in FIG. 5(C) is applied between both terminals of the V-phase coil, and a pulse wave Vwn shown in FIG. 5(D) is applied between both terminals of the W-phase coil. Further, as these pulse waves Vun, Vvn are converted into a voltage between both terminals of a series circuit including the U-phase coil and the V-phase coil, it becomes a pulse wave Vuv the pulse width of which successively varies to follow the sine wave as shown in FIG. 5(E). Likewise, a voltage between both terminals of a series circuit including the V-phase coil and the W-phase coil and a voltage between both terminals of a series circuit including the W-phase coil and the U-phase coil become pulse waves Vvw and Vwu to follow the sine waves as shown in FIGS. 5(F) and 5(G). Then, three-phase alternating currents comprising sine waves which are shifted 120 degrees from one another in phase in correspondence to these pulses waves Vuv, Vvw and Wwu are applied to the motor 19. In this way, the inverter control section 42 performs PWM control to apply the three-phase alternating currents from the three-phase bridge circuit 43 to the motor 19.

The inverter control section 42 has been preset with a first duty limiting valve C1 and a second duty limiting value C2 for PWM control. Ordinarily, the first duty limiting valve C1 is applied by a limiting value selector switch 54 shown in FIG. 4 to the triangle wave comparator section 47. The triangle wave comparator section 47 with the first duty limiting valve C1 applied thereto limits the duty ratio in the PWM control to the first duty limiting valve C1 or under. Specifically, where symbols T5 and T4 are taken respectively as the interval between a pair of intersection points P2 and P2 at which each of the three-phase alternating current waves Vu1*, Vv1*, Vw1* crosses the triangle wave K, and as one mountain cycle of the triangle wave as shown in FIG. 7(A), the duty ratio (r) determined by the three-phase alternating current waves Vu1*, Vv1*, Vw1* and the triangle wave K can be calculated from an expression r=1−(T5/T4).

Then, the triangle wave comparator section 47 determines the peak level of each three-phase alternating current wave Vu1*, Vv1*, Vw1* to a predetermined value L1 relative to the peak level of the triangle wave K so that the duty ratio (r) becomes to the first duty limiting valve C1 or under. As a result, the interval between the pair of intersection points P1 and P1 of a peak area of each three-phase alternating current wave Vu1*, Vv1*, Vw1* (Vu1* only exemplified in FIG. 7(A)) with a peak point neighborhood of the triangle wave K becomes the sum (T3 in FIG. 7(A)) of a current detection time T2 by each shunt resistance Ru, Rv or Rw and a dead time T1 taken to switch each switch UH, UL, VH, . . . or longer.

Further, the limiting value selector switch 54 operates when a predetermined condition referred to later is satisfied, to apply the second duty limiting value C2 to the triangle wave comparator section 47. The second duty limiting value C2 is greater than the first duty limiting valve C1. Specifically, where the duty ratio (r) is set to the second duty limiting value C2, the interval between the pair of intersection points P1 and P1 of the peak area of each three-phase alternating current wave Vu1*, Vv1*, Vw1* with the peak point neighborhood of the triangle wave K becomes approximately the same length as the dead time T1 taken to switch each switch UH, UL, VH, . . . . That is, the second duty limiting value C2 is a value calculated by an expression C2=1−[dead time T1]/[one mountain cycle T4 of triangle wave]. Thus, when the second duty limiting value C2 is applied to the triangle wave comparator section 47 with the satisfaction of the predetermined condition, the limitation on the duty ratio is mitigated.

Ordinarily, the inverter control section 42 detects phase currents through the shunt resistances Ru, Rv, Rw in the three-phase bridge circuit 43 and converts the phase currents into a q-axis current Iq2 and a d-axis current Id2 by a d-q converter 48. Then, the q-axis current Iq2 and the d-axis current Id2 are used for current-feedback control. The inverter control section 42 detects the phase currents based on the terminal-to-terminal voltages of the shunt resistances Ru, Rv, Rw at a timing when the triangle wave K reaches the mountain-side peak (i.e., at the timing when the influence by the noise caused by the ON/OFF operations of the switches UH, UL, VH, . . . is the least and when current is applied to all of the shunt resistances Ru, Rv, Rw).

Further, when the predetermined condition is satisfied, the inverter control section 42 stops current detections by the shunt resistances Ru, Rv, Rw and performs the current-feedback control using an inferred q-axis current Iq3 and an inferred d-axis current Id3 which are inferred by an inference circuit 49. Specifically, when the predetermined condition is satisfied, the inverter control section 42 detects electric potentials Vu, Vv, Vw at median points on respective phase circuits 43U, 43V, 43W in the three-phase bridge circuit 43 and performs three-phase/d-q conversion of these electric potentials Vu, Vv, Vw by the d-q converter 48 to calculate a q-axis voltage Vq2 and a d-axis voltage Vd2. Thereupon, the inference circuit 49 receives the q-axis voltage Vq2, the d-axis voltage Vd2 and the motor rotational angle θ7 detected by the motor rotational angle sensor 25 and calculates the inferred q-axis current Iq2 and the inferred d-axis current Id2 by the use of the following [expression 1].

$$Id2 = \frac{R \cdot Vd2 + \omega 7 \cdot L \cdot Vq2 - \omega 7 \cdot L \cdot Eq}{R^2 + (\omega 7 \cdot L)^2}$$ [Expression 1]

$$Iq2 = \frac{-\omega 7 \cdot L \cdot Vd2 + R \cdot Vq2 - R \cdot Eq}{R^2 + (\omega 7 \cdot L)^2}$$

$$Eq = \omega 7 \cdot Ke$$

In the above Expression 1, symbol ω7 denotes a time-differentiated value of the motor rotational angle θ7. Further, symbols R, L and Ke respectively denote the sum of resistances of the phase circuits in the motor 19 and the wiring, an inductance of the coils of the motor 19 and a back electromotive voltage constant, and these parameters inherent in the motor 19 are stored in advance in a data table provided in the inverter control section 42. Further, the aforementioned [Expression 1] can be derived from a known expression (refer to the following [Expression 2]) which is described in a reference entitled "Theory and Practice on AC Servomotor System" (Publisher: Sougou-Denshi, Authors: Hidehiko Sugimoto, Masato Koyama and Sinzoh Tamai), page 73.

$$\frac{d}{dt}\begin{bmatrix} Id2 \\ Iq2 \end{bmatrix} = \begin{bmatrix} -\frac{R}{L} & \omega 7 \\ -\omega 7 & -\frac{R}{L} \end{bmatrix}\begin{bmatrix} Id2 \\ Iq2 \end{bmatrix} + \frac{1}{L}\begin{bmatrix} Vd2 \\ Vq2 \end{bmatrix} - \frac{1}{L}\begin{bmatrix} 0 \\ Eq \end{bmatrix}$$ [Expression 2]

In the inverter control section 42, current value selector switches 51, 52 are provided between an output part of the inference circuit 49 and an output part of the d-q converter 48. Ordinarily, these current value selector switches 51, 52 operate to select the q-axis current Iq2 and the d-axis current Id2 calculated by the d-q converter 48 to provide current feedbacks.

The inverter control section 42 is provided with a CPU, a ROM and a RAM (all not shown) and judges whether the aforementioned predetermined condition is satisfied or not, by making the CPU execute a condition judgment program PG1 (shown in FIG. 8) stored in the ROM at a predetermined cycle. Specifically, when executing the condition judgment program PG1, the inverter control section 42 obtains an engine rotational speed N1 (S1) and compares the speed N1 with a predetermined reference rotational speed Nk (S2: this step corresponds to "engine rotational speed judgment means" relating to the present invention). When the engine rotational speed N1 is higher than the reference rotational speed Nk (S2: YES), the inverter control section 42 obtains the steering angle θ2 from the steering angle sensor 34 (S3) and calculates a steering angular velocity ω2 by differentiating the steering angle θ2 with respect to time (S4).

Subsequently, a judgment is made of whether or not, the steering angular velocity ω2 is greater than a predetermined reference angular velocity ωk (S5: this step corresponds to "steering state judgment means" relating to the present invention). If the steering angular velocity ω2 is greater than the reference angular velocity ωk (S5: YES), the inverter control section 42 obtains an output voltage E1 outputted from the direct current power supply 14 through a voltage circuit 53 (refer to FIG. 2) provided in the motor driving control apparatus 40 (S6) and judges whether or not, the output voltage E1 is higher than a predetermined reference output voltage Ek (S7: this step corresponds to "output voltage judgment means" relating to the present invention).

Then, if the output voltage E1 is higher than the reference output voltage Ek (S7: YES), the inverter control section 42 stops the current detections by the shunt resistances Ru, Rv, Rw (S8) and instead, infers currents by the inference circuit 49 (S9). The inverter control section 42 alters the limiting value to be used for PWM control from the first duty limiting value C1 to the second duty limiting value C2 to mitigate the duty limitation (S10).

That is, the aforementioned condition is judged to have been satisfied if the engine rotational speed N1 is higher than the reference rotational speed Nk (S2: YES), if the steering angular velocity ω2 is greater than the reference angular velocity ωk (S5: YES) and if the output voltage E1 is higher than the reference output voltage Ek (S7: YES). When so judging, the inverter control section 42 operates the current value selector switches 51, 52 and the limiting value selector switch 54 and performs the PWM control with the use of the second duty control value C2 while performing the current-feedback control with the use of the inferred q-axis current Iq3 and the inferred d-axis current Id3 which have been calculated by the inference circuit 49.

If the engine rotational speed N1 is equal to or lower than the reference rotational speed Nk (S2: NO), if the steering angular velocity ω2 is equal to or lower than the reference angular velocity ωk (S5: NO) or if the output voltage E1 is equal to or lower than the reference output voltage Ek (S7: NO), the current detections by the shunt resistances Ru, Rv, Rw are continued, wherein neither the inference of the currents by the inference circuit 49 nor the mitigation of the duty limitation is executed. That is, the current value selector switches 51, 52 and the limiting value selector switch 54 are not operated to remain as they are.

Figure 9:
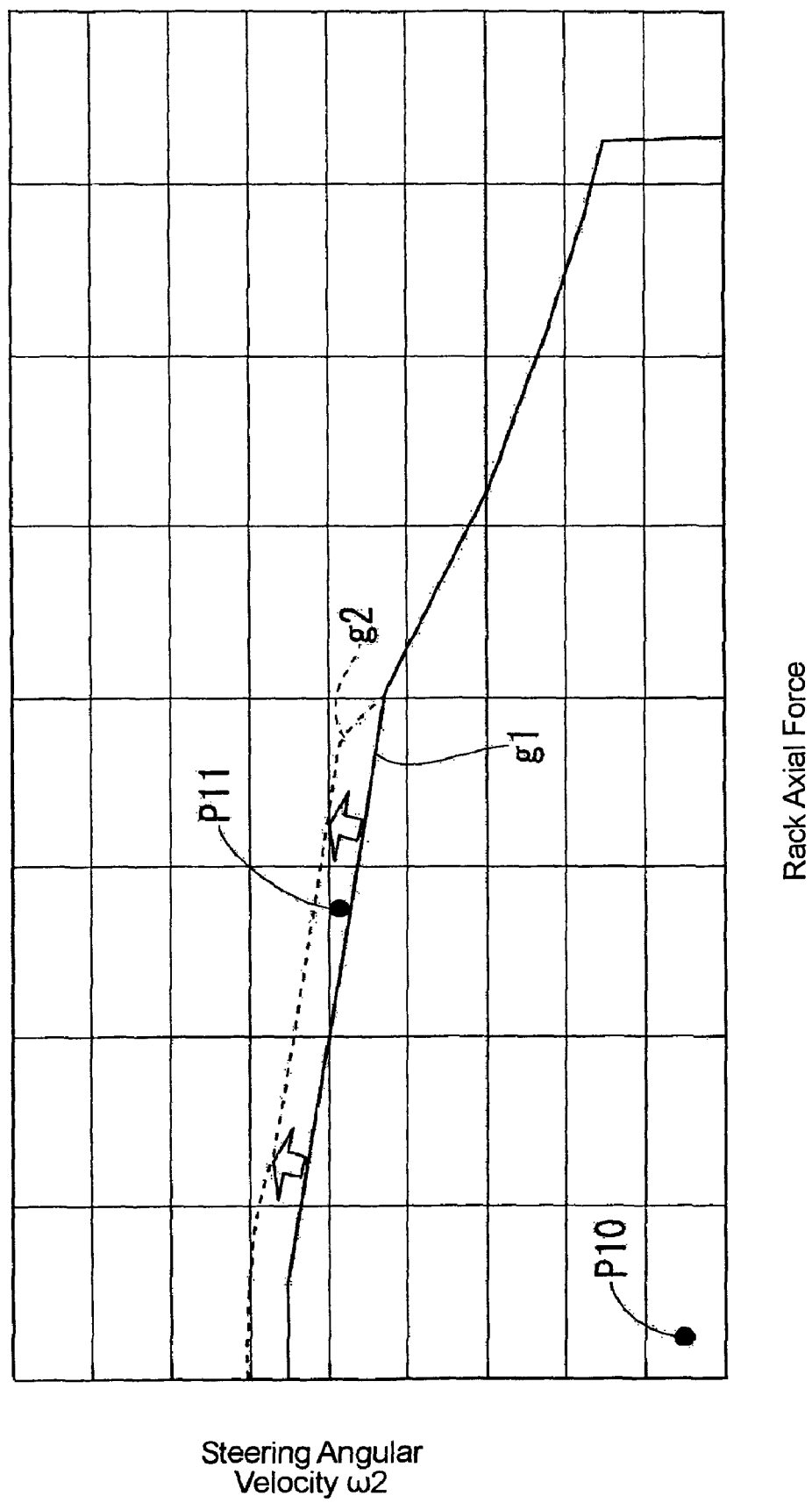
[FIG. 9] is a graph showing a property between a rack axial force and a steering angular velocity.

The construction of the present embodiment is as described above. Next, the operation and effects of the present embodiment will be described. When an ignition key switch of the vehicle 10 is turned ON, the electricity from the direct current power supply 14 is applied to the motor 19, and thus, the motor 19 outputs an assist force in dependence on the manipulation of the steering wheel 33. Where the friction coefficient of the road surface is as low as gravel road or the like and where the steering wheel 33 is steered gently, the motor 19 has a surplus in its output power, so that the motor 19 can be driven speedily to follow the steering manipulation of the steering wheel 33. FIG. 9 shows a critical property graph g1 regarding the axial force of the rack 30 and the steering angular velocity ω2 in the case that the PWM control is performed with the use of the aforementioned first duty limiting value C1. Further, the figure also shows another critical property graph g2 regarding the axial force of the rack 30 and the steering angular velocity ω2 in the case that the PWM control is performed with the use of the aforementioned second duty limiting value C2.

Where the steering wheel 33 is gently steered with the friction coefficient of the road surface being low as described above, the axial force of the rack 30 and the steering angular velocity ω2 become those values which as specified by a point P10 in the figure, are sufficiently lower than the critical values. On the contrary, where the steering wheel 33 is quickly steered on a paved road surface to park the vehicle 10 for example, it may occur that as indicated by another point P11, they slightly exceed the critical values indicated by the critical property graph g1.

If the PWM control were continued with use of the first duty limiting value C1, the resistance to the steering manipulation of the steering wheel 33 would become excessively high beyond the aforementioned damper effect due to an insufficient output power of the motor 19. However, in the motor driving control apparatus 40 in the present embodiment, when the steering angular velocity ω2 is greater than the predetermined reference angular velocity ωk, the actual motor drive currents (the inferred q-axis current Iq3 and the inferred d-axis current Id3) are inferred from the back electromotive voltage or the like in place of the current detections by the shunt resistances Ru, Rv, Rw, whereby the duty limiting value is changed from the first duty limiting value C1 to the second duty limiting value C2 to mitigate the limitation on the PWM control. As a consequence, the current applicable to the motor 19 can be increased to heighten the maximum allowable rotational speed of the motor 19. That is, when the steering wheel 33 is turned quickly, the critical values for the rack axial force and the steering angular speed ω2 are heightened as being shifted from the critical property graph g1 to the critical property graph g2 in FIG. 9, so that it can be realized to overcome the deficiency in output power of the motor 19.

As described above, in the present embodiment, it becomes possible to effectively utilize the output power of the direct current power supply 14 connected to the three-phase bridge circuit 43 by switching the duty limiting values C1, C2 in dependence on the steering state of the steering wheel 33, so that the motor 19 is enabled to follow the quick steering manipulation. In addition, since the power supply quantity to the motor 19 is increased under the condition that the output voltage E1 from the direct current power supply 14 to the three-phase bridge circuit 43 is higher than the reference output voltage Ek, the direct current power supply 14 can be preventing from falling in a deficiency of the output voltage.

Second Embodiment

Figure 10:
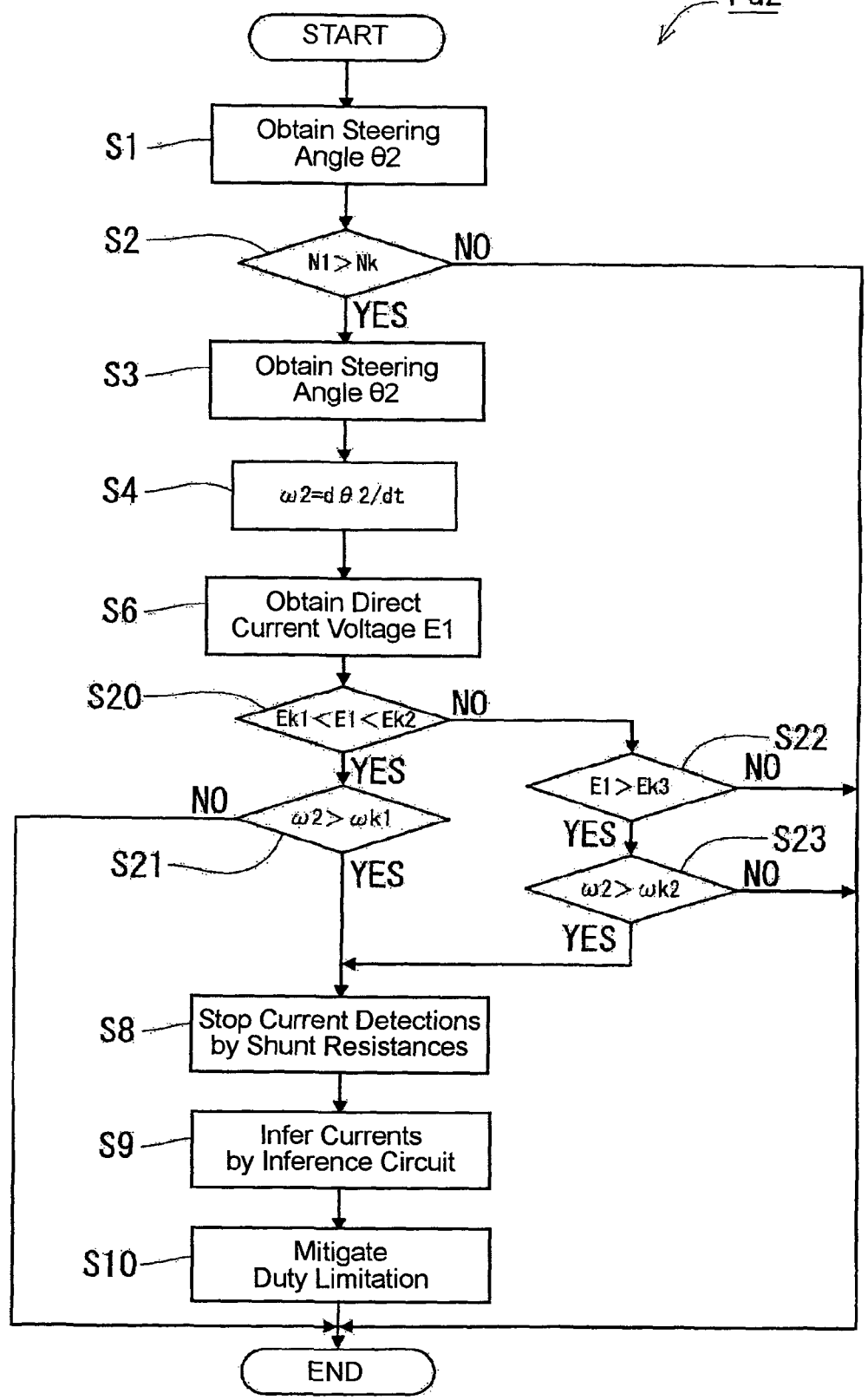
[FIG. 10] is a flow chart of the condition judgment program in a second embodiment.
Figure 11:
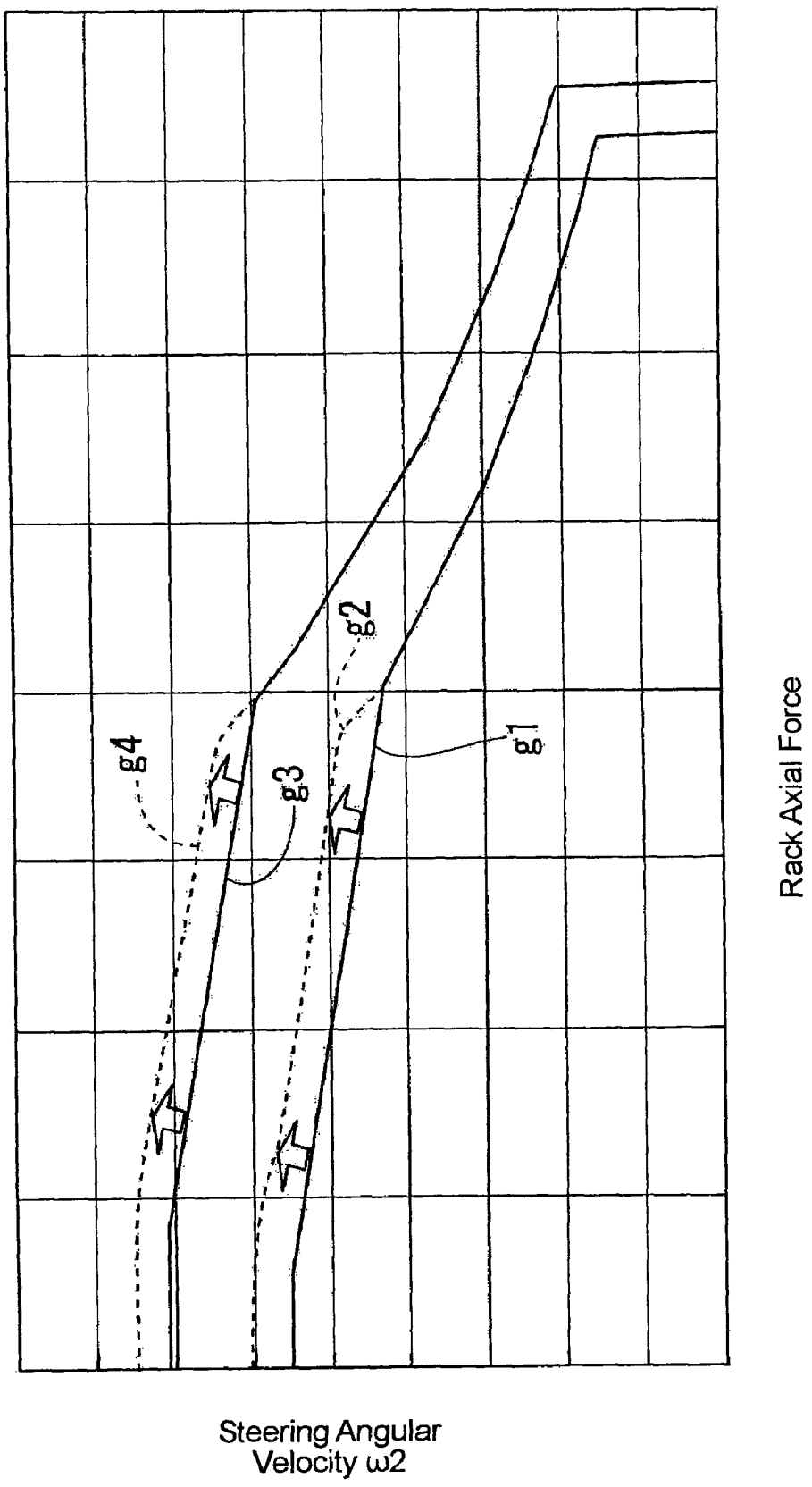
[FIG. 11] is a graph showing properties between the rack axial force and the steering angular velocity.
Figure 12:
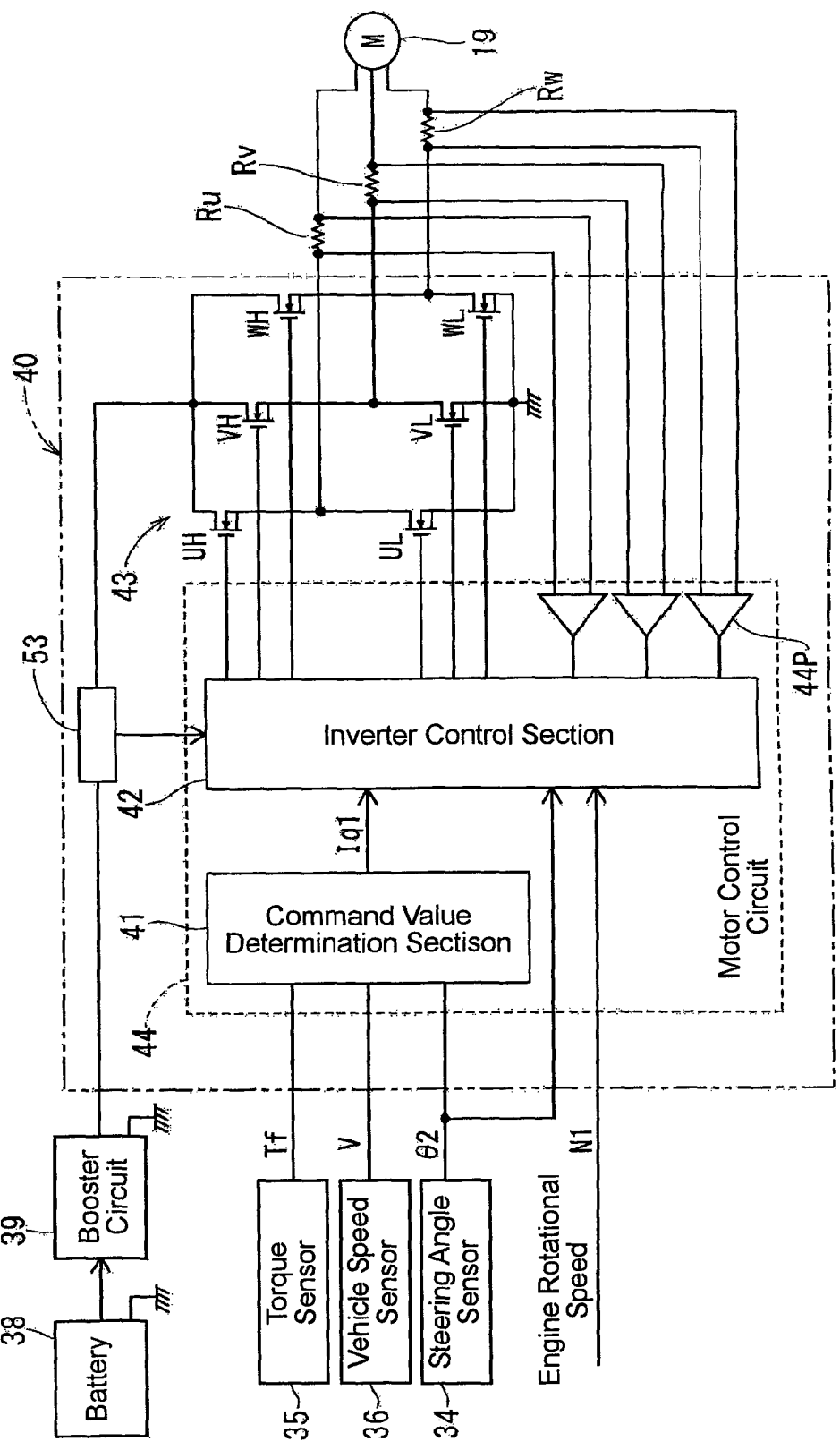
[FIG. 12] is a circuit diagram of the motor driving control apparatus in a modified form.
Figure 13:
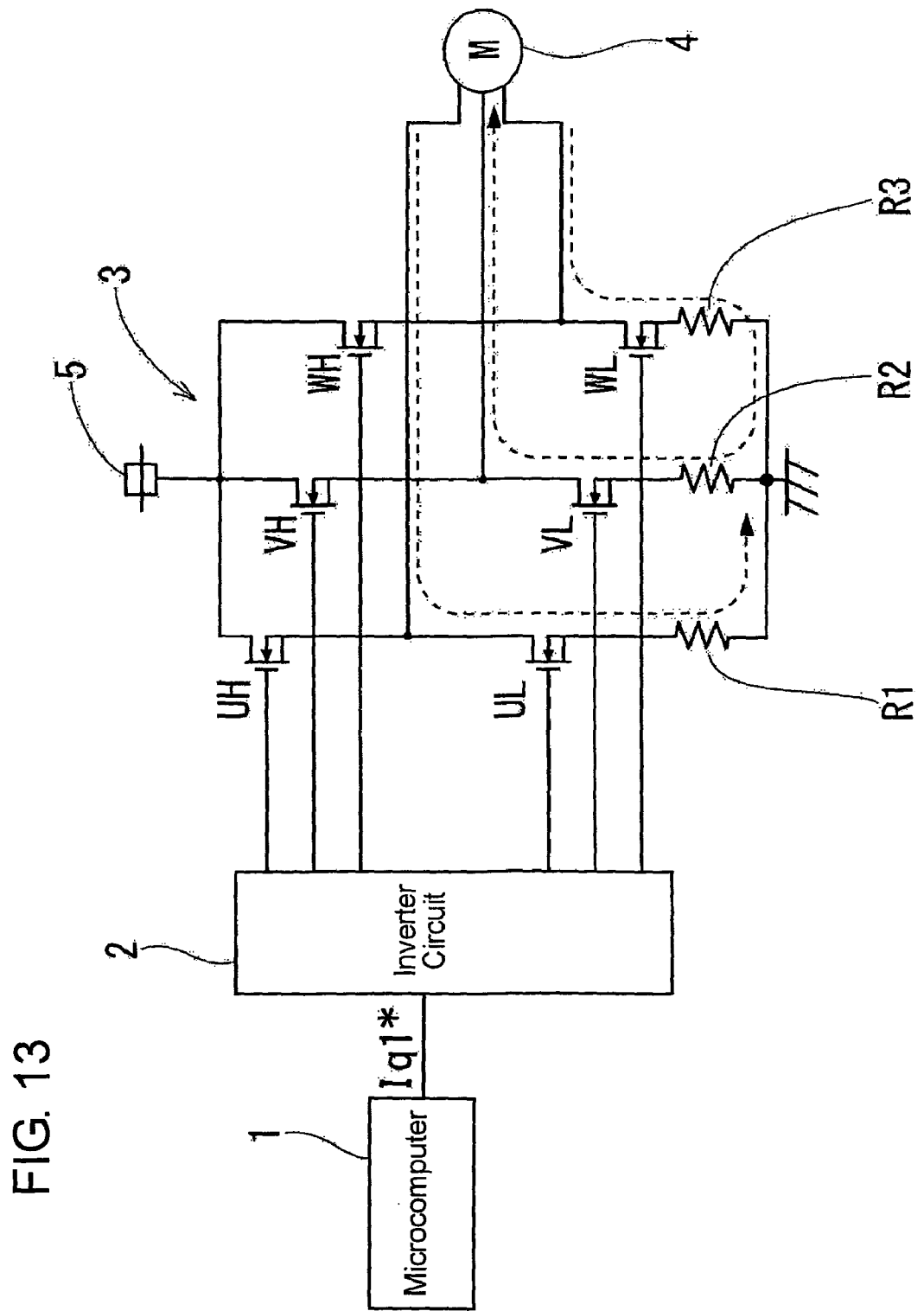
[FIG. 13] is a circuit diagram of a prior art motor driving control apparatus.
Figure 14:
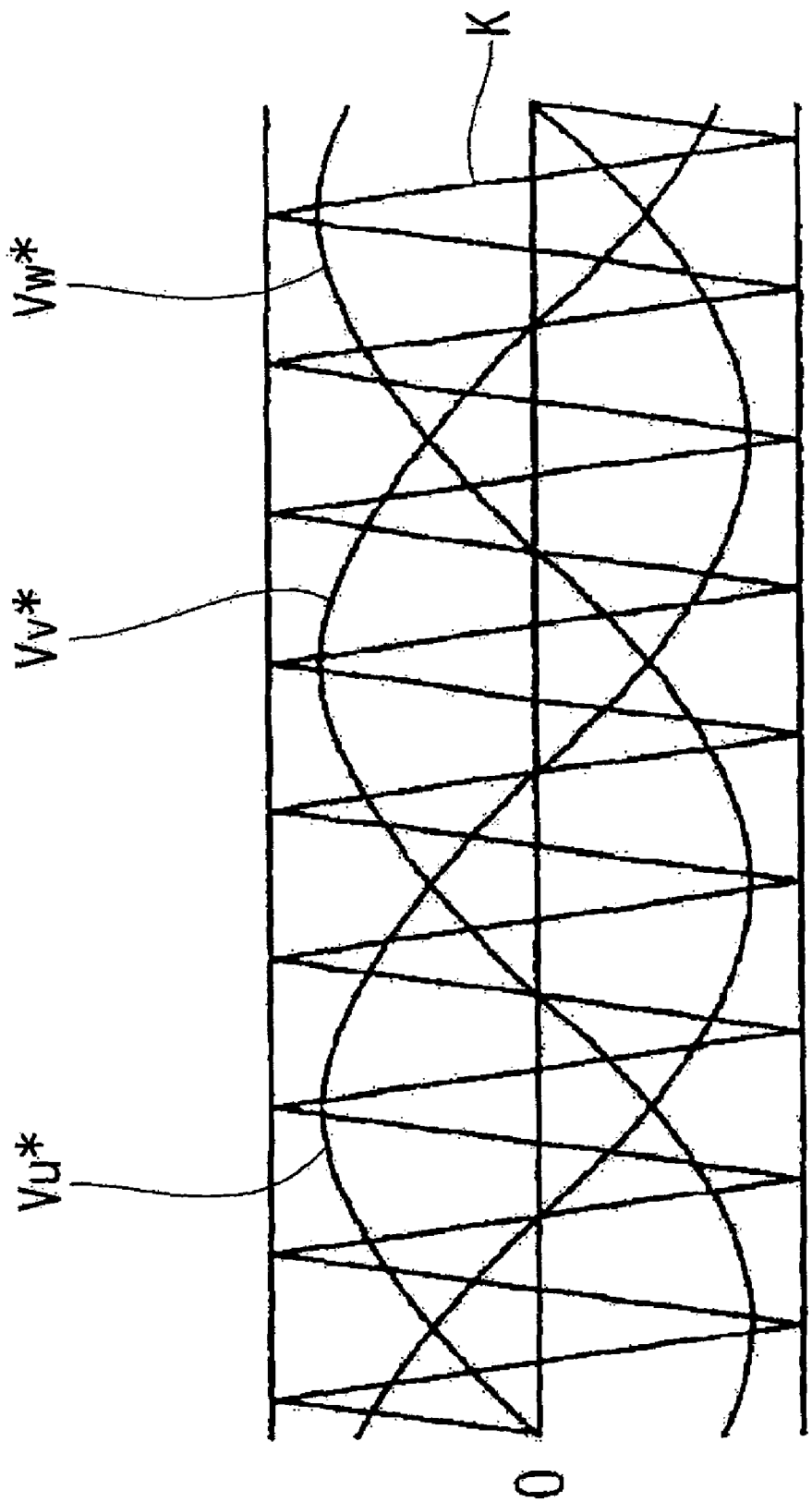
[FIG. 14] is a graph showing a triangle wave and three-phase alternating current command waves.
Figure 15:
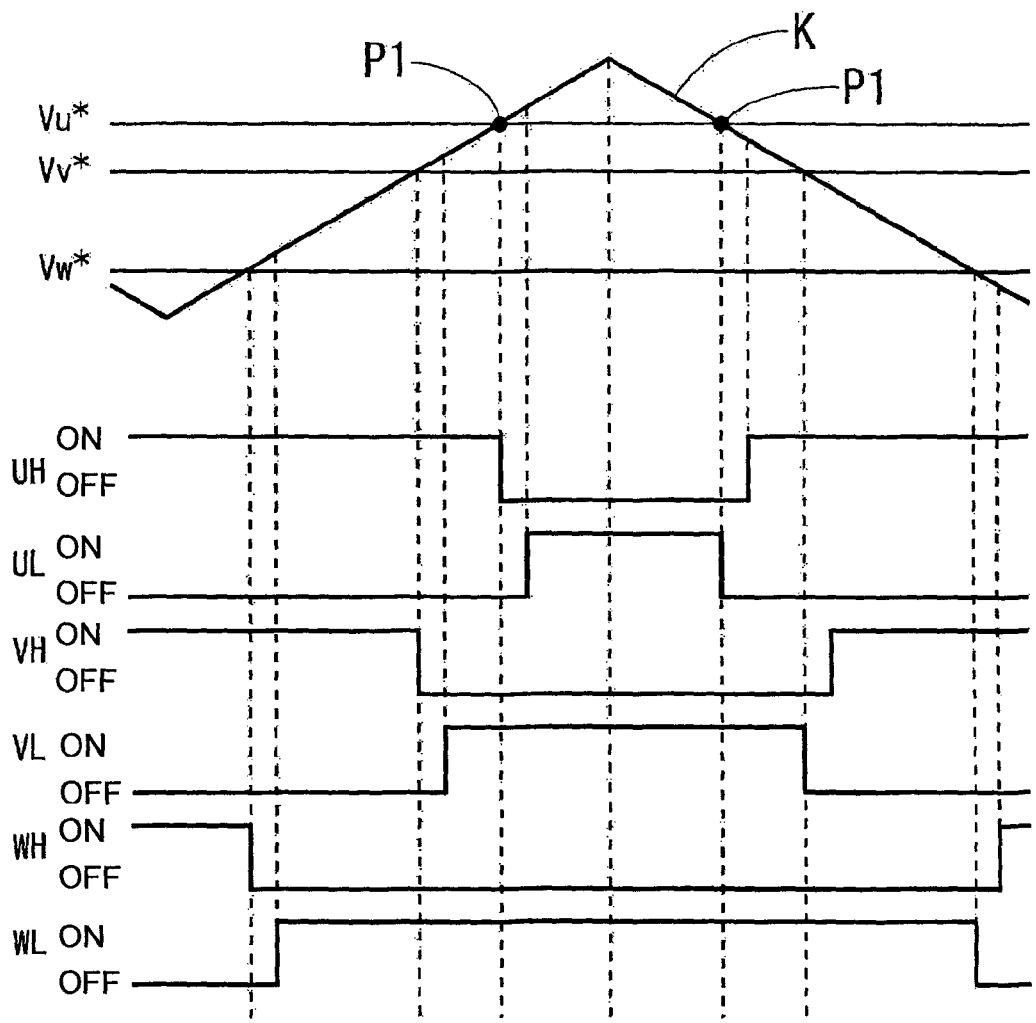
[FIG. 15] is a graph showing a triangle wave, three-phase alternating current command waves and ON/OFF control waves.
Figure 16:
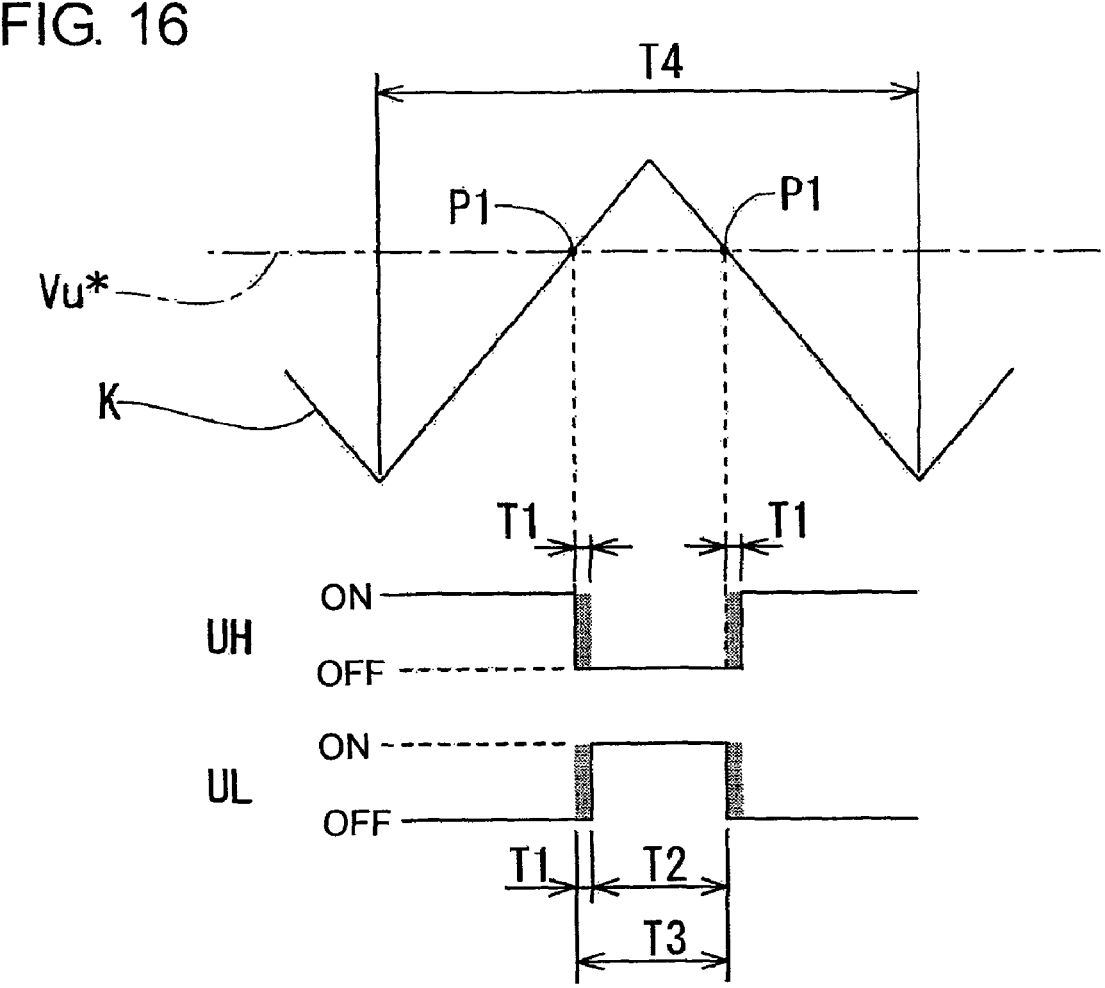
[FIG. 16] is a graph showing the triangle wave, a three-phase alternating current command wave, and the ON/OFF control waves.

This embodiment differs from the first embodiment mainly with respect to the configuration of a condition judgment program PG2. Hereafter, only constructions different from those in the first embodiment will be described with reference to FIGS. 10 and 11, and repetitive description regarding the same constructions will be omitted in exchange for assignments of the same reference numerals thereto.

That is, in the inverter control section 42 in the present embodiment, a first reference output voltage Ek1, a second reference output voltage Ek2 and a third reference output voltage Ek3 are set as the reference output voltages to be compared with the output voltage E1 of the direct current power supply 14. These have a relation Ek1<Ek2<Ek3. Further, a first reference angular velocity ωk1 and a second reference angular velocity ωk2 are set as the values to be compared with the steering angular velocity ω2 and have a relation ωk1<ωk2.

Then, when the condition judgment program PG2 is executed, a judgment is made of whether or not, the output voltage E1 from the direct current power supply 14 is a value between the first and second reference output voltages Ek1, Ek2 (S20).

If the output voltage E1 is a value between the first and second reference output voltages Ek1, Ek2 (S20: YES), the direct current power supply 14 is judged to be in a normal output state, and the first reference angular velocity ωk1 set for such normal output state is compared with the steering angular velocity ω2 (S21). Then, if the steering angular velocity ω2 is higher than the first reference angular velocity ωk1 (S21: YES), the processing from steps S8 to S10 is executed in the same manner as in the first embodiment to mitigate the limitation on the PWM control. As a consequence, the maximum output power of the motor 19 is increased when the steering wheel 33 is turned quickly in the normal output state of the direct current power supply 14. Therefore, the critical values for the rack axial force and the steering angular velocity ω2 can also be heightened as indicated as the change from the critical property graph g1 to the critical property graph g2 in FIG. 11.

On the other hand, if the output voltage E1 is not a value between the first and second reference output voltages Ek1, Ek2 (S20: NO), a judgment is made of whether or not, the output voltage E1 is higher than the third reference output voltage Ek3 (S22). For example, it may be the case that the output voltage E1 of the direct current power supply 14 becomes higher than that in the normal output state as a result that the booster circuit 39 boosts up the output of the battery 38 in the direct current power supply 14 which battery has been supplied with a sufficient electric supply from an alternator through a high speed rotation of the engine. In this case, the output voltage E1 is judged to be higher than the third reference output voltage Ek3 (S22: YES), and the second reference angular velocity ωk2 set for such output state is compared with the steering angular velocity ω2 (S23).

For example, where a high-speed, quick manipulation is performed as is the case of traveling on a course for automotive racing, the steering angular velocity ω2 is judged to have become higher than the second reference angular velocity ωk2 (S23: YES), and the processing from steps S8 to S10 is executed in the same manner as in the first embodiment to mitigate the limitation on the PWM control.

As a consequence, the maximum output power of the motor 19 is increased when the steering wheel 33 is turned quickly with the direct current power supply 14 being enabled to output a high power. Therefore, the critical values for the rack axial force and the steering angular velocity ω2 can also be heightened as indicated as the change from a critical property graph g3 to another critical property graph g4 in FIG. 11.

When the output of the direct current power supply 14 has been lower than the normal level, a judgment of NO is made at both of steps S20 and S22, in which case, the limitation on the PWM control is not mitigated to prevent the power increase of the motor 19.

Other Embodiments

The present invention is not limited to the foregoing embodiments. For example, embodiments described below are covered by the scope of the present invention, and further, the present invention can be practiced in various forms other than those embodiments noted below without departing from the gist thereof.

(1) Although in the foregoing first embodiment, the shunt resistances Ru, Rv, Rw are connected in series to the respective phase circuits 43U, 43V, 43W in the three-phase bridge circuit 43, the shunt resistances Ru, Rv, Rw may be connected in series between the respective phase circuits 43U, 43V, 43W in the three-phase bridge circuit 43 and the respective phase coils of the motor 19.

(2) Although the foregoing first embodiment is exemplified as one in which the present invention is applied to the motor driving control apparatus 40 for the motor 19 which is provided in the electric power steering system 11, the present invention may be applied to a motor driving control apparatus for a three-phase brushless motor which is provided in a steer-by-wire system or a variable transmission ratio steering system the transmission ratio of which is variable between a steering wheel and steered wheels.

(3) Although in the foregoing first embodiment, the motor 19 and the inter-steered wheel shaft 16 are connected by the ball screw mechanism 24, a mechanism for connecting the motor 19 to the steering train is not limited to such a ball screw mechanism. Therefore, there can be taken any of a construction that the motor 19 and the inter-steered wheel shaft 16 are connected through a rack-and-pinion mechanism, another construction that the motor 19 and the steering shaft 32 are connected through a worm and a worm wheel, and a still another construction that the motor 19 and the inter-steered wheel shaft 16 or the steering shaft 32 are connected through spur gears. In any of these constructions, the arrangement of the rack and the pinion, the worm and the worm wheel or the spur gears is not limited.

(4) In the condition judgment program PG1 in the foregoing first embodiment, a vehicle speed V may be obtained in place of the engine rotational speed N1, and the fact that the vehicle sped V exceeds a predetermined vehicle speed reference value may be used as the condition for mitigation of the duty limitation.

INDUSTRIAL APPLICABILITY

The motor driving control apparatus and the motor driving control method according to the present invention are suitable for use in an electric power steering system for motor vehicles which converts the rotation of a steering wheel by the driver into the axial movement of a rack shaft through a rack-and-pinion mechanism and which assists the axial movement of the rack shaft by amplifying the steering force of the driver by the use of a three-phase brushless motor, to change the orientation of steered wheels through tie rods and knuckle arms.

The invention claimed is:

1. A motor driving control method for applying three-phase alternating currents as motor drive current from a three-phase bridge circuit to a three-phase brushless motor provided in a vehicle for steering assist, by performing PWM control in a triangle comparison method based on a command value determined in dependence on a steering angle, a vehicle speed, and other driving states and for performing current-feedback control with actual motor drive currents detected by shunt resistances, the motor driving control method comprising:

judging whether or not a steering angular velocity is higher than a predetermined reference angular velocity;

when the steering angular velocity is lower than the predetermined reference angular velocity, detecting actual motor drive currents by the respective shunt resistances with the peak level of each of three-phase alternating current command waves being limited so that the interval between a pair of intersection points of a peak area of each of the three-phase alternating current command waves with a peak point neighborhood of a triangle wave, which waves are compared in the triangle comparison method, is made to be longer than the sum of a current detection time by the shunt resistances and a dead time for switching; and when the steering angular velocity is higher than the reference angular velocity, inferring an actual motor drive current from a back electromotive voltage and an applying voltage in the three-phase brushless motor instead of detecting the actual motor drive currents by the respective shunt resistances, and mitigating the limitation on the peak level of each of the three-phase alternating current command waves by permitting the interval between the pair of intersection points to become approximately the same length as the dead time.

2. A motor driving control apparatus comprising:

a three-phase bridge circuit connected to a three-phase brushless motor provided in a vehicle for steering assist;

a motor control circuit for making the three-phase bridge circuit output three-phase alternating currents as motor drive current, by performing PWM control in a triangle comparison method based on a command value determined in dependence on a steering angle, a vehicle speed, and other driving states;

shunt resistances for providing current-feedback of the motor drive current; and steering state judgment means for judging whether the steering manipulation is at the time of an ordinary steering in which the steering angular velocity is lower than a predetermined reference steering angular velocity or at the time of a quick steering in which the steering angular velocity is higher than the reference steering angular velocity; and wherein:

at the time of the ordinary steering, the motor control circuit detects actual motor drive currents by the respective shunt resistances with the peak level of each of the three-phase alternating current command waves being limited so that the interval between a pair of intersection points of a peak area of each of the three-phase alternating current command waves with a peak point neighborhood of a triangle wave, which waves are compared in the triangle comparison method, becomes longer than the sum of a current detection time by the shunt resistances and a dead time for switching, and at the time of the quick steering, the motor control circuit infers an actual motor drive current from a back electromotive voltage and an applying voltage in the three-phase brushless motor instead of the current detections by the shunt resistances and mitigates the limitation on the peak level of each of the three-phase alternating current command waves by permitting the interval between the pair of intersection points to become approximately the same length as the dead time.

3. The motor driving control apparatus as set forth in claim 2, further comprising:

output voltage judgment means for judging whether or not the output voltage from a direct current power supply provided in the vehicle to the three-phase bridge circuit is higher than a predetermined reference output voltage; and wherein the motor control circuit mitigates the limitation on the peak level of each of the three-phase alternating current waves under the condition that the output voltage of the direct current power supply is higher than the reference output voltage.

4. The motor driving control apparatus as set forth in claim 3, further comprising:

engine rotational speed judgment means for judging whether or not the rotational speed of an engine provided in the vehicle is higher than a predetermined reference rotational speed; and wherein the motor control circuit mitigates the limitation on the peak level of each of the three-phase alternating current wavers under the condition that the rotational speed of the engine is higher than the reference rotational speed.

5. The motor driving control apparatus as set forth in claim 2, further comprising:

engine rotational speed judgment means for judging whether or not the rotational speed of an engine provided in the vehicle is higher than a predetermined reference rotational speed; and wherein the motor control circuit mitigates the limitation on the peak level of each of the three-phase alternating current waves under the condition that the rotational speed of the engine is higher than the reference rotational speed.

6. A motor driving control apparatus comprising:

a three-phase bridge circuit connected to a three-phase brushless motor provided in a vehicle for steering assist;

a motor control circuit for making the three-phase bridge circuit output three-phase alternating currents as motor drive current, by performing PWM control in a triangle comparison method based on a command value determined in dependence on a steering angle, a vehicle speed, and other driving states;

shunt resistances for providing current-feedback of the motor drive current;

steering state judgment means for judging whether the steering manipulation is at the time of an ordinary steering in which the steering angular velocity is lower than a predetermined reference steering angular velocity or at the time of a quick steering in which the steering angular velocity is higher than the reference steering angular velocity;

current detection means provided in the motor control circuit and configured to operate at the time of the ordinary steering for detecting actual motor drive currents by the respective shunt resistances with the peak level of each of the three-phase alternating current command waves being limited so that the interval between a pair of intersection points of a peak area of each of the three-phase alternating current command waves with a peak point neighborhood of a triangle wave, which waves are compared in the triangle comparison method, becomes longer than the sum of a current detection time by the shunt resistances and a dead time for switching; and inference means provided in the motor control circuit and configured to operate at the time of the quick steering, for inferring an actual motor drive current from a back electromotive voltage and an applying voltage in the three-phase brushless motor instead of detecting the actual motor drive currents by the respective shunt resistances; and limitation mitigation means provided in the motor control circuit and configured to operate at the time of the quick steering, for mitigating the limitation on the peak level of each of the three-phase alternating current command waves by permitting the interval between the pair of intersection points to become approximately the same length as the dead time.

* * * * *